(12) United States Patent
Sekihara et al.

(10) Patent No.: US 8,268,112 B2
(45) Date of Patent: Sep. 18, 2012

(54) BONDING METHOD OF RESIN MEMBER

(75) Inventors: Kanji Sekihara, Toyokawa (JP); Masayoshi Uehira, Osaka (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/532,665

(22) PCT Filed: Mar. 19, 2008

(86) PCT No.: PCT/JP2008/055084
§ 371 (c)(1),
(2), (4) Date: Sep. 23, 2009

(87) PCT Pub. No.: WO2008/117717
PCT Pub. Date: Oct. 2, 2008

(65) Prior Publication Data
US 2010/0101720 A1    Apr. 29, 2010

(30) Foreign Application Priority Data
Mar. 27, 2007  (JP) .................................. 2007-080739

(51) Int. Cl.
*B29C 65/16* (2006.01)
(52) U.S. Cl. .................... 156/272.8; 156/308.2
(58) Field of Classification Search ......................... None
See application file for complete search history.

(56) References Cited

U.S. PATENT DOCUMENTS

| | | | | |
|---|---|---|---|---|
| 3,560,291 A | * | 2/1971 | Foglia et al. | 156/229 |
| 4,360,483 A | * | 11/1982 | Ayres | 264/2.7 |
| 5,639,363 A | * | 6/1997 | Ohmori et al. | 205/652 |
| 6,589,380 B2 | * | 7/2003 | Gnage et al. | 156/272.8 |
| 7,255,770 B2 | * | 8/2007 | Wissman | 156/304.2 |

(Continued)

FOREIGN PATENT DOCUMENTS

JP    62-142092    6/1987
(Continued)

OTHER PUBLICATIONS

English translation of Chinese Notification of the First Office Action mailed Dec. 7, 2011.

(Continued)

*Primary Examiner* — Richard Crispino
*Assistant Examiner* — Philip N Schwartz
(74) *Attorney, Agent, or Firm* — Cozen O'Connor

(57) ABSTRACT

A method for bonding resin members by laser welding in which melting of a resin member can be prevented on the contact surface with a base or a tool used for bonding. In the bonding method, a resin member (1) is mounted on a base (3) and a surface of the base (3) in contact with the resin member (1) is an optical mirror surface. A surface of the resin member (1) is coated with a light absorbing agent (4), a resin member (2) is placed thereon and then a laser light (10) is irradiated from the resin member (2) side in order to melt the resin on the bonding surface of the resin member (1) and the resin member (2), thereby bonding the resin members together. The laser light (11) penetrated through the bonding surface reaches the contact surface where the resin member (1) and the base (3) are in contact with each other, and since the laser light (11) penetrates the bonding surface without being scattered or absorbed, melting of the resin member can be prevented.

13 Claims, 3 Drawing Sheets

U.S. PATENT DOCUMENTS 7,298,941 B2 * 11/2007 Palen et al. .................. 385/33
2005/0109452 A1   5/2005 Basque

FOREIGN PATENT DOCUMENTS

| | | |
|---|---|---|
| JP | 1-310934 | 12/1989 |
| JP | 4-157082 | 5/1992 |
| JP | 2005-74775 | 3/2005 |
| JP | 2005-262531 | 9/2005 |
| WO | WO 00/03865 | 1/2000 |
| WO | WO 02/26476 | 4/2002 |
| WO | WO 03/028982 | 4/2003 |

OTHER PUBLICATIONS

English Translation of an Office Action issued on Mar. 13, 2012 in corresponding Japanese Application No. 2009-506302.

Search Report issued on May 11, 2012 in corresponding European Application No. 08 73 8677.

* cited by examiner (Prior Art)

BONDING METHOD OF RESIN MEMBER

RELATED APPLICATIONS

This is a U.S. National Phase Application under 35 U.S.C. 371 of International Application PCT/W2008/055084, filed on Mar. 19, 2008.

This application claims the priority of Japanese Application No.2007-080739 filed on Mar. 27, 2007, the entire content of which is hereby incorporated by reference.

TECHNICAL FIELD

The present invention relates to a joining method of joining two resin members by a laser welding.

BACKGROUND ART

In the case of joining two resin members by a laser welding, it is necessary to press and fix resin members to each other by the use of a base board to mount the resin members thereon and a jig. Here, the joining method of resin members according to the conventional technology will be explained with reference to FIG. 4. FIG. 4 is an illustration for explaining the joining method of resin members according to the conventional technology and is a cross sectional view of the resin members.

For example, a flat plate-shaped resin member 20 is mounted on a flat plate-shaped base board 22. And then, light absorbing agent 23 is coated on the surface of the resin member 20, and a flat plate-shaped resin member 21 is superposed on the light absorbing agent 23-coated surface of the resin member 20. And then, a flat plate-shaped pressing member 25 made of a light transmissive member, such as glass, is mounted on the resin member 21 so that the two resin members 20 and 21 are sandwiched between the pressing member 25 and the base board 22. On the condition that the resin members 20 and 21 are pressed with the pressing member 25, laser beams 10 are irradiated to the resin members 20 and 21 from above of the pressing member 25. The laser beams 10 pass through the pressing member 25 and the resin member 21, and are irradiated to the light absorbing agent 23. The laser beams 10 are absorbed by the light absorbing agent 23 so that heat is generated on a part (a melting region 24 shown in FIG. 4) and resin on the joined surfaces of the resin member 20 and the resin member 21 is melted, whereby the resin member 20 and the resin member 21 are joined to each other.

In the case of conducting a laser welding, the most of the laser beams pass through the resin member 20. The laser beams 11 having passed through the resin member 20 reach the surface of the base board 22 being the surface coming in contact with the resin member 20. In the case that the surface (the surface coming in contact with the resin member 20) of the base board 22 is made of a material incapable of allowing a laser beam to pass through, the laser beams 11 are scattered about or absorbed on the surface, and heat is generated on the surface (the surface in contact with the resin member 20) of the base board 22. If heat is generated on the surface of the base board 22, the surface of the resin member 20 coming in contact with the surface is melted (a melting region 26 shown in FIG. 4). As a result, there is a fear that the surface shape of the base board 22 may be transferred to the surface of the resin member 20. Especially, in the case that the surface of the base board 22 is rough, if the rough surface patter of the base board 22 is transferred to the surface of the resin member 20, the surface appearance of the component obtained by the joining get deteriorated. The deterioration of the surface appearance results in the deterioration of the quality of external appearance. For example, in the case that an optical detection, evaluation, and the like are conducted by irradiating light beams to a component obtained by a joining process, the deterioration of the quality of external appearance causes a fear to provide adverse effects to the performance of detection and evaluation.

Patent documents 1 discloses a method of joining plastic plates to each other by a thermo-compression bonding, an ultrasonic welding, an adhesive, or a laser welding. However, Patent documents 1 does not disclose a technique to avoid generation of heat on the surface of a base board in a laser welding. Therefore, it is difficult to solve the above problem.

Patent documents 1: Japanese Patent Unexamined Publication No. 2005-74775

DISCLOSURE OF THE INVENTION

Problem to be Solved by the Invention

This invention has been made to solve the above-mentioned problem, and an object of the invention is to provide a resin member joining method capable of prevent resin members from being melted on the surfaces of the resin members being in contact with a base board or a jig used in a process of joining the resin members to each other by a laser welding.

Means for Solving the Problem

In the first embodiment of this invention, a resin member joining method is characterized in that a first resin member having an optical transparency for incident laser beams is mounted on a base board whose surface coming in contact with the first resin member is a mirror surface; a second resin member having an optical transparency is superposed on the surface of the first resin member opposite to the base board across a light absorbing agent having a light absorptive for incident light; on the condition that the first resin member and the second resin member are pressed, laser beams are irradiated from the outside of the second resin member through the light absorbing agent so as to melt the joined surface of the first resin member and the joined surface of the second resin member so that the first resin member and the second resin member are joined to each other.

Here, the optical mirror surface in the present invention means a surface having a surface roughness Ra in a range of 5 nm or more and 100 nm or less.

Further, in the second embodiment of this invention, the resin member joining method related to the first embodiment is characterized in that on the second resin member, mounted is a pressing member whose surface coming in contact with the second resin member is an optical mirror surface so that laser beams are irradiated on the condition that the first resin member and the second resin member are sandwiched between the pressing member and the base board and the first resin member and the second resin member are pressed.

Further, in the third embodiment of this invention, the resin member joining method related to the second embodiment is characterized in that one of the pressing member and the base board is made of a light transmissive member having an optical transparency for incident laser beams and laser beams are irradiated through the light transmissive member of the one.

Further, in the fourth embodiment of this invention, the resin member joining method related to the first embodiment or the second embodiment is characterized in that at least one surface of the base board coming in contact with the first resin member is made of a light transmissive member having an optical transparency for incident laser beams.

Further, in the fifth embodiment of this invention, the resin member joining method related to the third embodiment or the fourth embodiment is characterized in that the light transmissive member is glass, quartz, or transparent resin.

Further, in the sixth embodiment of this invention, the resin member joining method related to the first embodiment or the second embodiment is characterized in that at least one surface of the base board coming in contact with the first resin member is made of metal.

Further, in the seventh embodiment of this invention, the resin member joining method related to any one of the first embodiment to the sixth embodiment is characterized in that in at least one resin member of the first resin member and the second resin member, a groove is formed on a joined surface.

Effect of the Invention

According to this invention, in the case of joining resin members to each other by a laser welding, with the structure that the surface of a base board on which a resin member is mounted is made to an optical mirror surface, laser beams having been irradiated to the resin member and having passed through the resin member are not scattered about or absorbed on the surface of the base board. Therefore, since heat is not generated on the contact surfaces between the base board and the resin member, the resin member on the contact surface can be prevented from being melted.

Figure 1A:
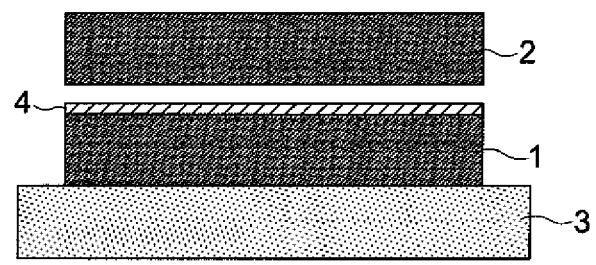
FIG. 1 is an illustration for explaining a joining method of resin members according to an embodiment of this invention and is a cross sectional view of the resin members.

EXPLANATION OF REFERENCE SYMBOLS 1, 2, and 7 Resin member
3 Base board
4 Light absorbing agent
5 Melting region
6 Pressing member
8 Groove
10 and 11 Laser beam

BEST MODE FOR CARRYING OUT THE INVENTION

[Embodiment]

A joining method of members (resin members) made of resin according to an embodiment of this invention will be explained with reference to FIGS. 1 and 2. FIGS. 1 and 2 are illustrations for explaining a joining method of members made of resin according to the embodiment of this invention, and are cross sectional views of the member made of resin.

Figure 2:
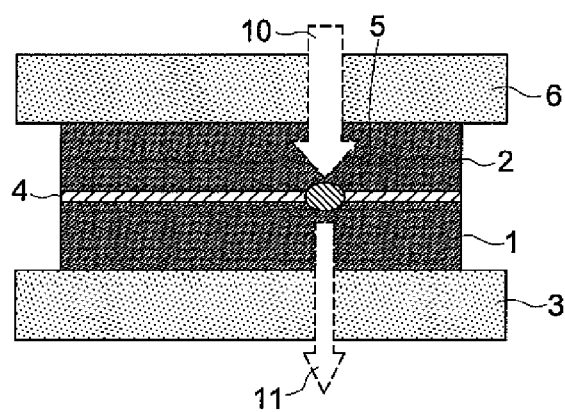
FIG. 2 is an illustration for explaining a joining method of resin members according to an embodiment of this invention and is a cross sectional view of the resin members.

As shown in FIG. 1(a), a member 1 made of resin (or a resin member 1) and a member 2 made of resin (or a resin member 2) are a flat plate shaped substrates respectively. Further, the resin member 1 and the resin member 2 have optical transparency. At the time of joining the resin member 1 and the resin member 2, the resin member 1 is mounted on a flat plate shaped base board 3.

In FIG. 1(a), the bottom surface of the first resin member (resin member 1) is named a 1-1 surface and the top surface of the first resin member is named a 1-2 surface in claims. Also, the bottom surface of the second resin member (resin member 2) is named a 2-1 surface and the top surface of the second resin member is named a 2-2 surface.

A surface of the base board 3 coming in contact with the resin member 1 is made to an optical mirror surface. The term "optical mirror surface" in the present invention means a surface formed so as to have a surface roughness Ra within a range of from 5 nm to 100 nm.

The base board 3 is made of a material having optical transparency for incident laser beams. Here, the term "having an optical transparency" means to have a characteristic with a light transmittance of 80% or more for incident light beams. For example, glass, quartz, or transparent resin is used as a material of the base board 3. As a glass material, BK7, synthetic quartz, and the like are usable. Further, as transparent resin, polymethyl methacrylate, cyclic polyolefin, polycarbonate, and the like having transparency for laser beams with a wavelength of about 800 nm are usable. In this embodiment, the light transmittance of the base board 3 is 80% to 95%.

In this embodiment, in order to join the resin member 1 and the resin member 2 by a laser welding, resin having optical transparency for laser beams is used for the resin member 1 and the resin member 2. For example, since polymethyl methacrylate, cyclic polyolefin, and the like have transparency for laser beams with a wavelength of about 800 nm, these resin materials are usable for the resin members 1 and 2.

(Laser Welding)

In the case of joining the resin member 1 and the resin member 2 by laser irradiation, as shown in FIG. 1(a), a light absorbing agent 4 is coated on the surface of the resin member 1. For example, the light absorbing agent 4 is coated on the surface of the resin member 1 by a dispenser or a stamp method. Here, as the light absorbing agent, an agent having a light absorptive for incident laser beams is usable. Further, a light absorptive means an absorption to absorb 50% to 95% of laser beams with the wave length. As the light absorbing agent 4 according to this embodiment, an infrared absorbing agent or a UV absorber is used in accordance with the wavelength of laser beams.

Figure 1B:
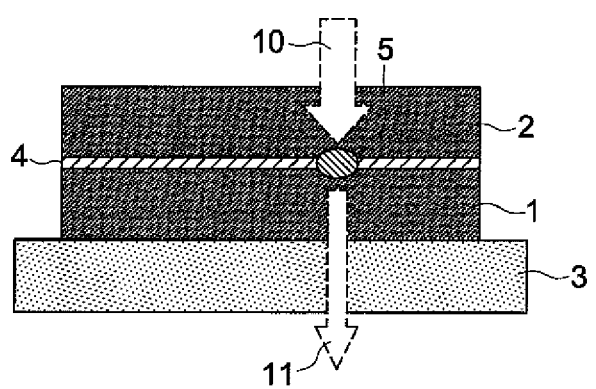

After the light absorbing agent 4 has been coated onto the surface of the resin member 1, as shown in FIG. 1(b), the resin member 1 and the resin member 2 are superposed. Then, on the condition that the resin member 2 is pressed onto the resin member 1, laser beams 10 are irradiated to the resin member 1 and the resin member 2. In the example shown in FIG. 1, the laser beams 10 are irradiated from the resin member 2 side so that the laser beams 10 pass through the resin member 2 and are absorbed by the light absorbing agent 4. Heat is generated at a portion (melting region 5 shown in FIG. 1(b)) where the laser beams 10 are absorbed, whereby the resins on the respective joined surfaces of the resin member 1 and the resin member 2 is melted.

As mentioned above, the resins on the respective joined surfaces of the resin member 1 and the resin member 2 is melted, whereby the resin member 1 and the resin member 2 are joined. The laser welding can be adopted by a well-known technique. For example, the technique described in Japanese Patent Unexamined Publication No. 2005-74796 may be adopted. As one example, the resin member 1 and the resin member 2 are scanned with an infrared laser with a power of 0.1 W to 20 W, whereby the resin member 1 and the resin member 2 are joined.

Further, the laser beams 10 irradiated to the resin member 1 and the resin member 2 pass through the respective joined surfaces of the resin member 1 and the resin member 2. Then, the laser beams 11 having passed through the joined surfaces further pass through the resin member 1 and reach the base board 3. The base board 3 is made of a material capable of allowing laser beams to pass through, such as glass, quartz, and a transparent resin, and the surface (contact surface with the resin member 1) of the base board 3 is made to an optical mirror surface (surface roughness Ra is 5 nm or more and 100 nm or less). Therefore, the laser beams 11 having passed through the resin member 1 further passed through the base board 3. At this time, the laser beams 11 are not scattered nor absorbed on the contact surfaces between the base board 3 and the resin member 1. As a result, since heat is not generated on the contact surfaces between the base board 3 and the resin member 1, the surface (the contact surface with the base board 3) of the resin member 1 is no melted.

Here, in consideration of the flatness of the base board 3 and a cooling effect at the time of joining the resin members 1 and 2, it is desirable to use glass as the material of the base board 3.

As mentioned above, if the surface (the contact surface with the resin member 1) of the base board 3 is made into an optical mirror surface, the resin member 1 and the resin member 2 can be joined without melting the surface (the contact surface with the base board 3) of the resin member 1. Therefore, the resin member 1 and the resin member 2 can be joined without making the surface shape of the base board 3 to transfer to the surface (the contact surface with the base board 3) of the resin member 1. As a result, it becomes possible to improve the quality of external appearance of product components obtained by the joining process.

Further, onto the surface of product components produced by this joining process, the surface state of a base board 3 is reflected. Therefore, it becomes possible to produce product components with good quality of external appearance.

Moreover, as the material of the base board 3, in place of a material to make laser beams to pass through, a material to reflect laser beams may be used. For example, as the material of the base board 3, a metal may be used. Even in the case of using a metal for the material of the base board 3, the surface (the contact surface with the resin member 1) of the base board 3 is made into an optical mirror surface (surface roughness Ra is 5 nm or more and 100 nm or less). Thus, even if a metal is used as the material of the base board 3, since the contact surface with the resin member 1 is made to an optical mirror surface, the laser beams 11 having passed through the resin member 1 is reflected on the surface (the contact surface with the resin member 1) of the base board 3. At this time, the laser beams 11 are not scattered nor absorbed on the contact surfaces between the base board 3 and the resin member 1. As a result, since heat is not generated on the contact surfaces between the base board 3 and the resin member 1, the surface (the contact surface with the base board 3) of the resin member 1 is not melted. Thereby, the resin member 1 and the resin member 2 can be joined, without making the surface shape of the base board 3 to transfer to the surface (the contact surface with the base board 3) of the resin member 1.

As a metal used for the base board 3, a stainless steel alloy, an aluminum alloy, and the like are used, and the metal may be subjected to a Ni—P electroless plating process, a Cr plating process, and the like as surface treatment.

Further, it is desirable for a pressing member for pressing the resin member 1 and the resin member 2 that the surface of the pressing member coming in contact with the resin member is an optical mirror surface (a surface roughness Ra is 5 nm or more and 100 nm or less). When a laser welding is conducted, as shown in FIG. 2, a flat plate-shaped pressing member 6 is mounted on the resin member 2 so that the resin member 1 and the resin member 2 are sandwiched between the pressing member 6 and the base board 3. As this pressing member 6, a material capable of allowing laser beams to pass through is used. For example, glass, quartz, or transparent resin is employed as the material of the pressing member 6.

And, on the condition that the pressing member 6 presses the resin members 1 and 2, the resin members 1 and 2 are irradiated with laser beams 10 from above of the pressing member 6. The laser beams 10 having passed through the pressing member 6 and the resin member 2 is irradiated to a light absorbing agent 4. With this irradiation, the resins on the respective joined surfaces of the resin member 1 and the resin member 2 is melted, whereby the resin member 1 and the resin member 2 are joined.

The surface (the surface coming in contact with the resin member 2) of the pressing member 6 used for pressing the resin member 1 and the resin member 2 is made to an optical mirror surface (surface roughness Ra is 5 nm or less and 100 nm or less). Therefore, laser beams 10 irradiated from above of the pressing member 6 pass through without being scattered about or absorbed on the contact surface of the pressing member 6 and the resin member 2. As a result, since heat is not generated on the contact surface of the pressing member 6 and the resin member 2, the surface (the contact surface with the pressing member 6) of the resin member 2 is not melted. Accordingly, the resin member 1 and the resin member 2 can be joined without transferring the surface shape of the pressing member 6 onto the surface (the contact surface with the pressing member 6) of the resin member 2.

Herein, the base board 3 may be structured such that at least the surface of the base board 3 coming in contact with the resin member 1 is made of a material capable of allowing laser beams to pass through. In other words, even if the whole body of the base board 3 is not made of a material capable of allowing laser beams to pass through, it may be permissible that at least the surface of the base board 3 coming in contact with the resin member 1 is made of a material capable of allowing laser beams to pass through. That is, the surface (the surface coming in contact with the resin member made 1) of the base board 3 is made of glass, quartz, or transparent resin, and the surface is made to an optical mirror surface (the surface roughness Ra is 5 nm or more and 100 nm or less). In this way, with the structure that the surface of the base board 3 is made of a material capable of allowing laser beams to pass through and made to an optical mirror surface, laser beams 11 are not scattered about or absorbed on the contact surface between the base board 3 and the resin member 1 and heat is not generated on the contact surface. As a result, since the resin member 1 is not melted on the contact surface with the base board 3, it becomes possible to join the resin member 1 and the resin member 2 without transferring the surface shape of the base board 3 onto the surface (the contact surface with the base board 3) of the resin member 1.

Further, one of the base board 3 and the pressing member 6 is made of a material having an optical transparency for incident laser beams and another one may be made of a metal. Here, the term "having optical transparency" means to have a characteristic with a light transmittance of 80% or more for incident light beams. For example, glass, quartz, or transparent resin is used as a material having optical transparency. As a glass material, BK7, synthetic quartz, and the like are usable. Further, as transparent resin, polymethyl methacrylate, cyclic polyolefin, polycarbonate, and the like having transparency for laser beams with a wavelength of about 800 nm are usable. In this embodiment, the light transmittance of one of the base board 3 and the pressing member is 80% to 95%.

In this case, the resin members 1 and 2 are irradiated with laser beams through the base board 3 or the pressing member 6 which is made of a member having an optical transparency for laser beams. For example, when the base board 3 is made of metal, the pressing member 6 is made of glass, quartz, or transparent resin, and the resin members 1 and 2 are irradiated with laser beams through the pressing member 6. On the other hand, when the pressing member 6 is made of metal, the base board 3 is made of glass, quartz, or transparent resin, and the resin members 1 and 2 are irradiated with laser beams through the base board 3. Further, when both the base board 3 and the pressing member 6 are made of a material (glass, quartz, or transparent resin) to allow laser beams to pass through, and the resin members 1 and 2 may be irradiated with laser beams through either one of the base board 3 and the pressing member 6.

MODIFIED EXAMPLE

Next, a modified example of the joining method of resin members according to the above-mentioned embodiment will be explained with reference to FIG. 3. FIG. 3 is an illustration for explaining the joining method of resin members according to the modified example, and is a cross sectional view of the resin members. In the embodiment mentioned above, resin members having respective flat surfaces were joined to each other. However, resin members having microscopic geometries on their surfaces may be joined to each other. In this modified example, a resin member having a surface on which a groove is formed and a flat plate shaped resin member are joined to each other.

Figure 3A:
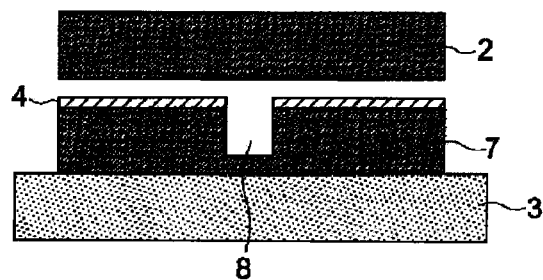
FIG. 3 is an illustration for explaining a joining method of resin members according to a modified embodiment and is a cross sectional view of the resin members.

As shown in FIG. 3(a), on a surface of the resin member 7, a groove 8 extending over the surface is formed. A resin member 2 serving as the other party of the joining of the resin member 7 is a flat plate shaped substrate. And then, the resin member 7 and the resin member 2 are joined such that the surface having the groove 8 formed thereon is positioned inside, whereby a component in which a flow channel is formed inside is produced. With this structure, the resin member 2 acts as a lid (cover) for the groove 8.

As shown in FIG. 3 (a), the resin member 7 is mounted on the base board 3 in such a way that the surface opposite to the surface on which the groove 8 is formed is positioned at the base board 3 side. And then, a light absorbing agent 4 is coated onto the surfaces other than groove 8 by a stamping method. In this way, with the structure that the light absorbing agent 4 is coated onto the surfaces other than groove 8, it becomes possible to prevent the groove 8 from generating heat and being melted, whereby even if a laser welding is conducted, it becomes possible to maintain the configuration of the groove 8.

Figure 3B:
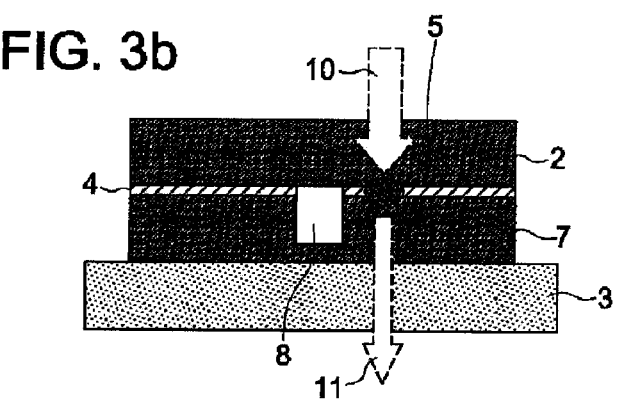
Figure 4:
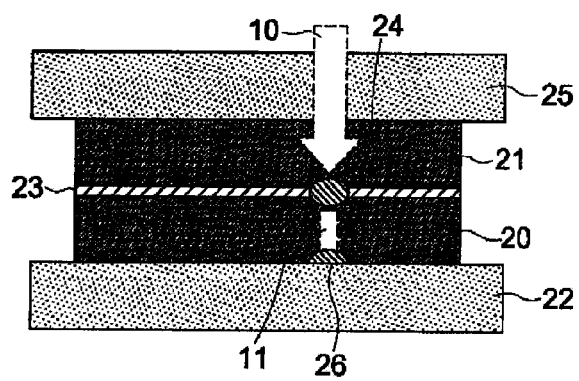
FIG. 4 is an illustration for explaining a joining method of resin members according to the conventional technology and is a cross sectional view of the resin members.

After the light absorbing agent 4 is coated onto the surface of the resin member 7, as shown in FIG. 3(b), the resin member 2 and the resin member 7 are superposed in such a way that the surface on which the groove 8 is formed is positioned inside. And then, on the condition that the resin member 2 and the resin member 7 are pressed, laser beams 10 are irradiated to the resin member 2 and the resin member 7. As with the embodiment mentioned above, with a technique to irradiate laser beams 10 from the resin member 2 side, the laser beams 10 pass through the resin member 2, and are absorbed by the light absorbing agent 4. Heat is generated on the part (a melting region 5 shown in FIG. 3(b)) by which the laser beams 10 were absorbed, and the resins on the respective joined surfaces of the resin member 2 and the resin member 7 are melted.

As mentioned above, since the resins on the respective joined surfaces of the resin member 2 and the resin member 7 are melted, the resin member 2 and the resin member 7 are joined to each other.

Further, as with the embodiment mentioned above, the laser beams 10 pass through the respective joined surfaces of the resin member 2 and the resin member 7. Then, the laser beams 11 having passed through the joined surfaces further pass through the resin member 7. As with the embodiment mentioned above, the base board 3 is made of a material capable of allowing laser beams to pass through, such as glass, quartz, or transparent resin, and further the surface (the contact surface with the resin member 7) of the base board 3 is made to an optical mirror surface (the surface roughness Ra is 5 nm or more and 100 nm or less). Therefore, the laser beams 11 having passed through the resin member 7 further pass through the base board 3. At this time, since the laser beams 11 are not scattered and absorbed on the contact surfaces between the base board 3 and the resin member 7, heat is not generated on the contact surfaces. With this, if becomes possible to join the resin member 2 and the resin member 7 without melting the surface (the contact surface with the base board 3) of the resin member 7 on the contact surface with the base board 3.

A component in which the resin member 2 and the resin member 7 are joined can be used as a device called a micro analysis chip or a μTAS (Micro Total Analysis Systems) to conduct a chemical reaction, dissociation, analyses, and the like for liquid samples, such as nucleic acid, protein, and blood.

In the case of using the component for such a microchip, for example, a through hole passing through a substrate is formed in the resin member 7 on which the groove 8 is formed. If the through hole is formed to adjoin to the groove 8, when the resin member 7 and the resin member 2 are joined to each other, the through hole serves an opening section to connect the groove 8 to the outside. This opening section is a port through which gel, samples, and a buffer solution, preservation are introduced, preserved and discharged. The shape of the opening section may be made in one of various shapes in addition to a circle shape and rectangular shape. To this opening section, a tube or a nozzle provided in an analyzing device is connected so that through the tube or the nozzle, gel, samples, or a buffer solution is introduced into a groove 8, or discharged from the groove 8. Here, a through tube may be formed in the resin member 2 so as to form the opening section.

As mentioned above, in the case of using the resin members 2 and 7 as a microchip, as long as the shape of the resin members 2 and 7 are a shape which is handled and analyzed easily, any kind of shapes may be permissible. For example, a size of about from 10 mm square to 200 mm square is desirable, and a size of about from 10 mm square to 100 mm square is more desirable. The shape of the resin members 2 and 7 may be made to match with an analytical method and an analyzing device, and the shape may be a square, a rectangle, and a circular shape.

Moreover, in consideration of an ability to reduce a used amount of each of a sample for analysis and a reagent and the production accuracy, transfer ability and separating ability of a shaping mold, the shape of the groove 8 is preferably made with a width within a range 10 μm to 200 μm and a depth of 30 μm and 200 μm, however, the shape of the groove 8 is not limited specifically. Further, the aspect ratio (the depth of the groove/the width of the groove) is preferably 0.1 to 3, more preferably 0.2 to 2. Further, the depth and width of the groove may be determined in accordance with the usage of a microchip. Here, in order to make the explanation simple, the shape of a cross section of the groove 8 shown in FIGS. 3(*a*) and 3(*b*) is a rectangular shape, and the width of the groove 8 is made a constant in the depth direction. Further, this shape is one example of the groove 8, and the cross sectional shape may be a curved surface.

Furthermore, in the case of using the resin members 2 and 7 as a microchip, the thickness of the resin members 2 and 7 is in a range of about 0.2 mm to 5 mm, and in consideration of formability, 0.5 mm to 2 mm is desirable. Moreover, in the case of not forming a groove in the resin member 2 acting as a lid (cover), a film (a shape shaped member) not a plate-shaped member is used as the resin member 2. In this case, the thickness of a film is desirably 30 μm to 300 μm, and more desirably 50 μm to 150 μm.

As mentioned above, with a technique to produce microchip by joining the resin members 2 and 7 with the base board 3, it becomes possible to produce a microchip with a good surface roughness Ra, whereby at the time of an examination, it becomes possible to conduct a good examination, analyses, and the like without interfering the passage of light beams.

EXAMPLE

Next, a concrete example will be described.
(Resin Members 1 and 2)

A transparent resin material of cyclic polyolefin resin (Zeonor: manufactured by Nippon Zeon Co., Ltd.) was shaped by an injection molding machine so that a plate-shaped member with outside dimensions 50 mm×50 mm×1 mm was produced. This plate-shaped member corresponds to the resin member 1 and the resin member 2 according to the above-mentioned embodiment.
(Base Board 3, Pressing Member 6)

As the base board 3 on which the resin member 1 was mounted, a glass substrate with an optical mirror surface having a surface roughness Ra of 10 nm was used. As a glass material, BK7 was used. This base board 3 had a light transmittance of 92%.

Moreover, as a pressing member 6 for pressing the resin member 1 and the resin member 2, a glass substrate made to an optical mirror surface with a surface roughness Ra of 10 nm used. As a glass material, BK7 was used. This pressing member 6 had a light transmittance of 92%.
(Joining by a Laser Welding)

The resin member 1 was mounted on the base board 3 made of a glass substrates, and a light absorbing agent 4 was coated onto the surface of the resin member 1. As the light absorbing agent 4, Clearweld made by GENTEX Corporation being an infrared absorbing agent was used. Thereafter, the resin member 2 was mounted on the resin member 1 in such a way that the light absorbing agent 4 was placed between the resin members 1 and 2.

Then, the resin member 1 and the resin member 2 were pressed between the base board 3 and the pressing member 6, and on this pressed condition, the resin members 1 and 2 were irradiated with laser beams, whereby the resin members 1 and 2 are joined to each other. The irradiation condition of laser beams and a pressing condition are shown below.

On the condition that the resin member 1 and the resin member 2 were pressed with a pressure force of 100 N, the entire surface was scanned with infrared laser beams with a wavelength of 808 nm, a spot diameter of φ 0.6 mm and an output of 5 W at a scanning speed of 10 mm/sec, whereby the resin member 1 and the resin member 2 were joined with each other.
(Evaluation)

It was confirmed that the surface (the surface coming in contact with the base board 3) of the resin member 1 was not melted. Also, it was confirmed that the surface (the surface coming in contact with the pressing member 6) of the resin member 2 was not melted. Thus, the melting of resin on the surface (the surface coming in contact with the base board 3) of the resin member 1 was avoided, further, the melting of resin on the surface (the surface coming in contact with the pressing member 6) of the resin member 2 was avoided, whereby the quality of external appearance of a component structured by the resin member 1 and the resin member 2 was able to be improved.

Here, this invention is not limited to the conditions of the surface roughness Ra of the resin material, the base board 3 and the pressing member 6 used in this example. Even if the resins listed in the embodiment mentioned above were used, the same effects as this example can be attained. Moreover, if the surface of the base board 3 and the pressing member 6 is an optical mirror surface (the surface roughness Ra is 5 nm or more and 100 nm or less), the same effects as this example can be attained.

The invention claimed is:

1. A resin member joining method for joining two resin members which are configured to be irradiated with light for optical detection, comprising the steps of:

mounting a first resin member having an optical transparency for an incident laser beam on a base board having a supporting surface being an optical mirror surface in such a way that a 1-1 surface of the first resin member is brought in contact with the supporting surface of the base board;

coating a light absorbing agent capable of absorbing an incident laser beam on a 1-2 surface of the first resin member opposite to the 1-1 surface;

superposing a 2-1 surface of a second resin member having an optical transparency for an incident laser beam onto the 1-2 surface of the first resin member across the coated light absorbing agent; and irradiating a laser beam to the coated light absorbing agent from a 2-2 surface side of the second resin member opposite to the 2-1 surface so as to melt the 1-2 surface of the first resin member and the 2-1 surface of the second resin member which are in contact with the coated light absorbing agent irradiated with the laser beam so that the first resin member and the second resin member are joined to each other, wherein the optical mirror surface is a surface having a surface roughness Ra in a range of 5 nm or more and 100 nm or less such that the laser beam is prevented from scattering on the supporting surface and heat generation caused by a scattered laser beam is prevented.

2. The resin member joining method described in claim 1, further comprising the step of:

mounting a pressing member having a pressing surface being an optical mirror surface on the second resin member in such a way that the pressing surface of the pressing member is brought in contact with the 2-2 surface of the second resin member, wherein the laser beam is irradiated on the condition that the first resin member and the second resin member are sandwiched and pressed between the pressing member and the base board.

3. The resin member joining method described in claim 2, wherein at least one of the pressing member and the base board is made of a material having an optical transparency for an incident laser beam and the laser beam is irradiated through the at least one having an optical transparency.

4. The resin member joining method described in claim 1, wherein at least the supporting surface of the base board being in contact with the first resin member is made of a material having an optical transparency for an incident laser beam.

5. The resin member joining method described in claim 3, wherein the material having an optical transparency is glass, quartz, or transparent resin.

6. The resin member joining method described in claim 1, wherein at least the supporting surface of the base board coming in contact with the first resin member is made of metal.

7. The resin member joining method described in claim 1, wherein a groove is formed on at least one of the 1-2 surface of the first resin member and the 2-1 surface of the second resin member.

8. The resin member joining method described in claim 1, wherein the joined first and second resin members are used for a micro chip in which the joined first and second resin members allow light to pass therethrough.

9. A method for manufacturing a chip for optical analysis, comprising:
   mounting a first resin member having an optical transparency for an incident laser beam on a base board having an optical mirror surface so that a 1-1 surface of the first resin member is in contact with the mirror surface of the base board;
   providing a light absorbing agent capable of absorbing an incident laser beam on a 1-2 surface of the first resin member opposite to the 1-1 surface;
   superposing a 2-1 surface of a second resin member having an optical transparency for an incident laser beam onto the 1-2 surface of the first resin member so that the light absorbing agent is sandwiched between the first resin member and the second resin member; and
   irradiating a laser beam to the light absorbing agent from a 2-2 surface side of the second resin member opposite to the 2-1 surface so as to melt the 1-2 surface of the first resin member and the 2-1 surface of the second resin member which are in contact with the light absorbing agent irradiated with the laser beam so that the first resin member and the second resin member are joined to each other without making a surface shape of the base board to transfer to the 1-1 surface of the first resin member,
   wherein the mirror surface has a surface roughness Ra in a range of 5 nm or more and 100 nrn or less and prevents a heat generation from a contact portion between the mirror surface of the base board and the 1-1 surface of the first resin member.

10. The method according to claim 9, wherein the mirror surface prevents the heat generation between the base board and the first resin member by at least one of preventing a scatter of the laser beam on the mirror surface and preventing absorption of the laser beam in the base board.

11. The method according to claim 9, wherein the mirror surface prevents the heat generation between the base board and the first resin member by allowing the laser beam to pass the base board or by reflecting the laser beam from the mirror surface of the base board.

12. The method according to claim 9, wherein the first resin member has a groove and a through hole.

13. The method according to claim 12, wherein the light absorbing agent is provided onto the 1-2 surface of the first resin member other than the groove.

* * * * *